(12) United States Patent
Song et al.

(10) Patent No.: US 12,245,229 B2
(45) Date of Patent: Mar. 4, 2025

(54) METHOD AND DEVICE FOR DETERMINING A TRANSMISSION MODE

(71) Applicant: VIVO MOBILE COMMUNICATION CO., LTD., Guangdong (CN)

(72) Inventors: Yang Song, Guangdong (CN); Peng Sun, Guangdong (CN); Zhi Lu, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 411 days.

(21) Appl. No.: 17/579,767

(22) Filed: Jan. 20, 2022

(65) Prior Publication Data

US 2022/0150930 A1 May 12, 2022

Related U.S. Application Data

(63) Continuation of application No. PCT/CN2020/102686, filed on Jul. 17, 2020.

(30) Foreign Application Priority Data

Jul. 24, 2019 (CN) .......................... 201910673788.5

(51) Int. Cl.
*H04W 72/12* (2023.01)
*H04W 72/0446* (2023.01)
*H04W 72/0453* (2023.01)
*H04W 72/1273* (2023.01)
*H04W 72/23* (2023.01)

(52) U.S. Cl.
CPC ... *H04W 72/1273* (2013.01); *H04W 72/0446* (2013.01); *H04W 72/0453* (2013.01); *H04W 72/23* (2023.01)

(58) Field of Classification Search
CPC ............. H04W 72/1273; H04W 72/23; H04W 72/0446; H04W 72/0453
See application file for complete search history.

(56) References Cited

U.S. PATENT DOCUMENTS

| | | | |
|---|---|---|---|
| 2012/0093112 A1 | 4/2012 | Qu et al. | |
| 2019/0215712 A1 | 7/2019 | Babaei et al. | |

(Continued)

FOREIGN PATENT DOCUMENTS

| | | |
|---|---|---|
| CN | 109392111 A | 2/2019 |
| CN | 109511171 A | 3/2019 |

(Continued)

OTHER PUBLICATIONS

"On multi-TRP and multi-panel" Reno, US, May 13-17, 2019 (Year: 2019).*

(Continued)

*Primary Examiner* — Mewale A Ambaye
(74) *Attorney, Agent, or Firm* — Price Heneveld LLP

(57) ABSTRACT

A transmission mode determining method, an information configuration method, and a device are provided. The transmission mode determining method includes: determining, based on first preset information, a transmission mode of a physical downlink shared channel PSDCH scheduled by one downlink control information DCI; where the first preset information is carried in at least one of radio resource control RRC, a media access control control element MAC CE, and the DCI.

20 Claims, 2 Drawing Sheets

Send fourth present information to a terminal device, where the fourth preset information is used for configuring a second parameter, the second parameter is a frequency-domain division mode for a physical downlink shared channel PDSCH, and the second parameter is used by the terminal device to determine a transmission mode of the PDSCH — S201

(56) References Cited

U.S. PATENT DOCUMENTS

| | | | |
|---|---|---|---|
| 2019/0364546 A1* | 11/2019 | Kwak | H04L 5/0044 |
| 2020/0106475 A1 | 4/2020 | Chen et al. | |
| 2020/0383096 A1 | 12/2020 | Yang et al. | |
| 2020/0395988 A1* | 12/2020 | Lee | H04L 5/0087 |
| 2021/0058113 A1* | 2/2021 | Jung | H04W 72/23 |
| 2021/0315000 A1* | 10/2021 | Li | H04W 72/21 |
| 2021/0321291 A1* | 10/2021 | Yeo | H04W 28/06 |

FOREIGN PATENT DOCUMENTS

| | | | | |
|---|---|---|---|---|
| CN | 109802787 A | 5/2019 | | |
| EP | 2728787 A2 | 5/2014 | | |
| EP | 2747476 A1 * | 6/2014 | | H04B 7/063 |
| WO | 2011098044 A1 | 8/2011 | | |
| WO | 2019049096 A1 | 3/2019 | | |

OTHER PUBLICATIONS

ZTE, "Enhancements on Multi-TRP and Multi-panel Transmission", 3GPP TSG RAN WG1 #97, R1-1906236, May 13-May 17, 2019, Reno, USA.

ZTE, "On multi-PDCCH design for multi-TRP", 3GPP TSG RAN WG1 #97, R1-1906242, May 13-May 17, 2019, Reno, USA.

CATT, "On multi-TRP/panel tranmission", 3GPP TSG RAN WG1 Meeting #97, R1-1906345, May 13-May 17, 2019, Reno, USA.

Ericsson, "On multi-TRP and multi-panel", 3GPP TSG RAN WG1 Meeting RAN1#97, R1-1907697, Reno, US, May 13-17, 2019.

Intel Corp., "On multi-TRP/multi-panel transmission", 3GPP TSG RAN WG1 Meeting #97, R1-1907559, Reno, Nevada, USA, May 13-17, 2019.

Ericsson, "On multi-TRP and multi-panel", 3GPP TSG RAN WG1 Meeting RAN1#97, R1-1907418, Reno, US, May 13-17, 2019.

Huawei, "Reliability/robustness enhancement with multi-TRP/panel", 3GPP TSG RAN WG1 meeting #97, R1-1906039, Reno, USA, May 13-17, 2019.

Nokia, "Enhancements on Multi-TRP/Panel Transmission", 3GPP TSG RAN WG1 #97 Meeting, R1-1907316 Reno, USA, May 13-May 17, 2019.

CATT, "Consideration on multi-TRP/panel transmission", 3GPP TSG RAN WG1 #96bis, R1-1904561, Xi'an, China, Apr. 8-12, 2019.

Huawei, "Summary of AI: 7.2.8.2 Enhancements on Multi-TRP/Panel Transmission of Offline Discussion", 3GPP TSG RAN WG1 Meeting #96bis, R1-190abcd, Xi'an, China, Apr. 8-12, 2019.

NTT Docomo, Inc, "Enhancements on multi-TRP/panel transmission", 3GPP TSG RAN WG1 #96, R1-1902812, Athens, Greece, Feb. 25-Mar. 1, 2019.

* cited by examiner

Determine, based on first preset information, a transmission mode of a physical downlink shared channel PSDCH scheduled by one downlink control information DCI, where the first preset information is carried in at least one of radio resource control RRC, a media access control control element MAC CE, and the DCI — S101

FIG. 1

Send fourth present information to a terminal device, where the fourth preset information is used for configuring a second parameter, the second parameter is a frequency-domain division mode for a physical downlink shared channel PDSCH, and the second parameter is used by the terminal device to determine a transmission mode of the PDSCH — S201

FIG. 2

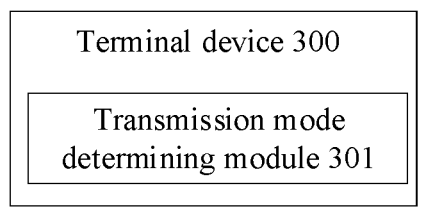

FIG. 3

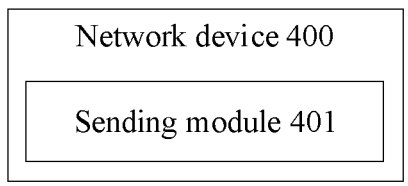

FIG. 4

METHOD AND DEVICE FOR DETERMINING A TRANSMISSION MODE

CROSS-REFERENCE TO RELATED APPLICATIONS

This application is a continuation application of PCT International Application No. PCT/CN2020/102686 filed on Jul. 17, 2020, which claims priority to Chinese Patent Application No. 201910673788.5, filed in China on Jul. 24, 2019, which are incorporated in their entireties by reference herein.

TECHNICAL FIELD

This disclosure relates to the field of communications technologies, and in particular, to a transmission mode determining method, an information configuration method, and a device.

BACKGROUND

High-frequency transmission is one of the features of a 5th generation (5G) mobile communications system. However, a higher transmission frequency used by a network device leads to a more limited coverage. Therefore, the concept of multiple transmission reception points (TRP) is introduced into 5G, and one cell may include multiple TRPs. The multiple TRPs may together send data to one terminal device (User Equipment, UE) to improve throughput or reliability.

Currently, it has already been confirmed that a multi-TRP transmission scenario supports various transmission modes. For example, in terms of frequency-domain resources used for multi-TRP transmission, the multi-TRP transmission scenario can support frequency division multiplexing (FDM), time division multiplexing (TDM), and space division multiplexing (SDM); in terms of types of supported services, the multi-TRP transmission scenario can support various transmission schemes such as enhanced mobile broadband (eMBB) and ultra reliable & low latency communication (uRLLC); in terms of participation modes of the TRPs for transmitting data to the same UE, the multi-TRP transmission scenario can support single-TRP transmission, dynamic point selection (DPS), non-coherent joint transmission (NCJT), and the like; and in terms of control signaling indication, one downlink control information (DCI) included in one physical downlink control channel (PDCCH) may schedule one or more physical downlink shared channels (PDSCH) to be sent by multiple TRPs to a same UE, and multiple DCIs included in multiple PDCCHs may schedule PDSCHs to be sent by respective TRPs.

However, in a multi-TRP scenario, when the UE receives the PDSCH scheduled by one DCI, how to determine a specific transmission mode is not clear yet.

SUMMARY

This disclosure provides a transmission mode determining method, an information configuration method, and a device.

According to a first aspect, a transmission mode determining method is provided, where the method is applied to a terminal device and includes:

determining, based on first preset information, a transmission mode of a physical downlink shared channel PSDCH scheduled by one downlink control information DCI; where the first preset information is carried in at least one of radio resource control (RRC), a media access control control element (MAC Control Element, MAC CE), and the DCI.

According to a second aspect, an information configuration method is provided, where the method is applied to a network device and includes:

sending fourth preset information to a terminal device; where the fourth preset information is used for configuring a second parameter, the second parameter is a frequency-domain division mode for a physical downlink shared channel PDSCH, and the second parameter is used by the terminal device to determine a transmission mode of the PDSCH.

According to a third aspect, a terminal device is provided. The terminal device includes:

a transmission mode determining module, configured to determine, based on first preset information, a transmission mode of a physical downlink shared channel PSDCH scheduled by one downlink control information DCI; where the first preset information is carried in at least one of radio resource control RRC, a media access control control element MAC CE, and the DCI.

According to a fourth aspect, a network device is provided. The network device includes:

a sending module, configured to send fourth preset information to a terminal device; where the fourth preset information is used for configuring a second parameter, the second parameter is a frequency-domain division mode for a physical downlink shared channel PDSCH, and the second parameter is used by the terminal device to determine a transmission mode of the PDSCH.

According to a fifth aspect, a terminal device is provided. The terminal device includes a memory, a processor, and a wireless communication program stored in the memory and capable of running on the processor, where when the wireless communication program is executed by the processor, the steps of the method according to the first aspect are implemented.

According to a sixth aspect, a network device is provided. The network device includes a memory, a processor, and a wireless communication program stored in the memory and capable of running on the processor, and when the wireless communication program is executed by the processor, the steps of the method according to the second aspect are implemented.

According to a seventh aspect, a computer-readable medium is provided. The computer-readable medium stores a wireless communication program, and when the wireless communication program is executed by a processor, the steps of the method according to the first aspect or the second aspect are implemented.

BRIEF DESCRIPTION OF DRAWINGS

To describe the technical solutions in the embodiments of this disclosure or in the prior art more clearly, the following briefly describes the accompanying drawings required for describing the embodiments or the prior art. Apparently, the accompanying drawings in the following description show merely some embodiments recorded in this disclosure, and a person of ordinary skill in the art may still derive other drawings from these accompanying drawings without creative efforts.

FIG. 1 is a schematic flowchart of an embodiment of a transmission mode determining method according to this disclosure;

FIG. 2 is a schematic flowchart of an embodiment of an information configuration method according to this disclosure;

FIG. 3 is a schematic structural diagram of an embodiment of a terminal device according to this disclosure;

FIG. 4 is a schematic structural diagram of an embodiment of a network device according to this disclosure;

DESCRIPTION OF EMBODIMENTS

Figure 5:
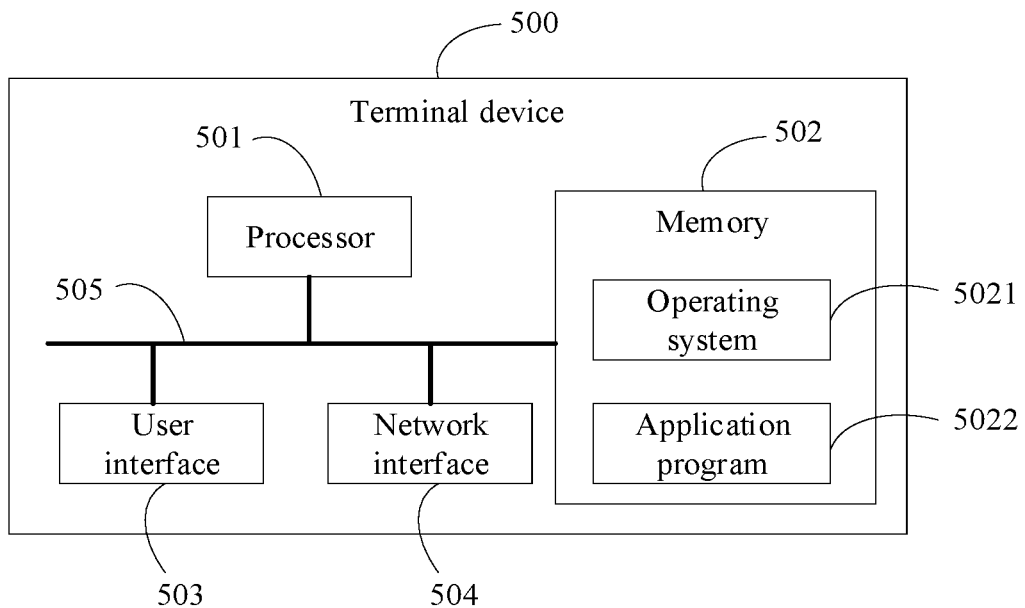
FIG. 5 is a schematic structural diagram of another embodiment of a terminal device according to this disclosure.

To make a person skilled in the art understand the technical solutions in this disclosure better, the following clearly describes the technical solutions in the embodiments of this disclosure with reference to the accompanying drawings in the embodiments of this disclosure. Apparently, the described embodiments are merely some but not all of the embodiments of this disclosure. All other embodiments obtained by a person of ordinary skill in the art based on the embodiments of this disclosure without creative efforts shall fall within the protection scope of this disclosure.

It should be understood that, the technical solutions in the embodiments of this disclosure may be applied to various communications systems, for example, a global system for mobile communication (GSM), a code division multiple access (CDMA) system, a wideband code division multiple access (WCDMA) system, general packet radio service (GPRS), a long term evolution (LTE) system, an LTE frequency division duplex (FDD) system, an LTE time division duplex (TDD) system, a universal mobile telecommunication system (UMTS), a worldwide interoperability for microwave access (WiMAX) communications system, or a 5G system which is also known as a new radio (NR) system.

User equipment UE may also be referred to as a mobile terminal, a mobile terminal device, or the like and may communicate with at least one core network through a radio access network (RAN). The terminal device may be a mobile terminal, such as a mobile phone (or referred to as a "cellular" phone) or a computer with a mobile terminal, and may, for example, be a portable, pocket-sized, handheld, computer built-in, or in-vehicle mobile apparatus, which exchanges voice and/or data with the radio access network.

A network device is an apparatus deployed in a radio access network and used for configuring information. The network device may be a base station, and the base station may be a base transceiver station (BTS) in GSM or CDMA, may be a NodeB in WCDMA, or may be an evolved NodeB (evolved Node B, eNB, or e-NodeB) in LTE or a 5G NodeB (gNB), or a network-side device in a later evolved communications system. However, the terms used do not constitute any limitation on the protection scope of this disclosure.

As shown in FIG. 1, a transmission mode determining method provided in an embodiment of this disclosure can be applied to a terminal device. The method may include the following steps.

Step 101: Determine, based on first preset information, a transmission mode of a physical downlink shared channel PSDCH scheduled by one downlink control information DCI; where the first preset information is carried in at least one of radio resource control RRC, a media access control control element MAC CE, and the DCI.

For example, the transmission mode of the PDSCH may include but is not limited to: at least one of a transmission scheme and transmission configuration information. For example, the transmission scheme is a transmission scheme such as FDM, TDM, or SDM; and the transmission configuration information includes a transmission configuration indicator (TCI) state, and the like.

Example 1

The transmission mode of the PDSCH includes the transmission scheme of the PDSCH. Correspondingly, step 101 may include: determining, based on a preset parameter included in the first preset information, a transmission scheme of the PDSCH; where the preset parameter includes at least one of a first parameter, a second parameter, a third parameter, a fourth parameter, and a fifth parameter. The following describes the five parameters in detail.

(1) First Parameter

The first parameter is the number of slot-based repetitions of the PDSCH in time domain. The first parameter is generally configured by RRC information and may be represented by N. 3GPP NR Rel-15 is taken as an example. The first parameter is configured by a pdsch-AggregationFactor field in PDSCH-Config of RRC, and a value may be 2, 4, or 8, that is, N=2, 4, or 8. If this field is not configured in PDSCH-Config, it means that no slot-based repetition exists, that is, N=1.

(2) Second Parameter

The second parameter is a frequency-domain division mode for the PDSCH. The second parameter may be configured by any information of the RRC, MAC CE, and DCI, and a value of the second parameter is one of a first value, a second value, and a third value.

Optionally, the second parameter is configured by the RRC information. That is, optionally, before step 101, the method shown in FIG. 1 further includes:

receiving fourth preset information from a network device, where the fourth preset information is used for configuring the second parameter, and the fourth preset information is carried in the RRC; and determining, based on the fourth preset information, the second parameter.

The first value indicates that the frequency-domain division mode for the PDSCH is a first preset mode, where the first preset mode is a division mode that does not use a frequency division multiplexing FDM transmission scheme.

The second value indicates that the frequency-domain division mode for the PDSCH is a second preset mode, where the second preset mode is a division mode in a preset FDM transmission scheme. For example, a typical preset FDM transmission scheme may be an FDM transmission scheme supported by uRLLC under TRPs. Correspondingly, the second preset mode may be a frequency-domain division mode in a first transmission mode (represented by scheme 2a) in the FDM transmission scheme supported by uRLLC under multiple transmission reception points.

The third value indicates that the frequency-domain division mode for the PDSCH is a third preset mode, where the third preset mode is another division mode in the preset FDM scheme. For example, a typical preset FDM transmission scheme may be an FDM transmission scheme supported by uRLLC under multiple TRPs. Correspondingly, the second preset mode may be a frequency-domain division mode in a second transmission mode (represented by scheme 2b) in the FDM transmission scheme supported by uRLLC under multiple transmission reception points.

For example, the first value, the second value, and the third value of the second parameter may be represented by 1, 2, and 3, respectively.

(3) Third Parameter

The third parameter is the number of TCI states indicated by the DCI scheduling the PDSCH. The third parameter is generally configured by the RRC information and is obtained from TCI field indication in the DCI scheduling the PDSCH. Some TCI states are selected by the MAC CE. A value of the third parameter may be 1, meaning that the number of TCI states indicated by the TCI field is 1; or a value of the third parameter may be greater than 1, for example, 2, meaning that the number of TCI states indicated by the TCI field is 2.

(4) Fourth Parameter

The fourth parameter is the number of mini-slot based repetitions of the PDSCH in time domain. The fourth parameter is generally configured or indicated by any information of the RRC, MAC CE, and DCI, and the fourth parameter may be represented by K. Generally, when K=1 (a value of the fourth parameter is 1), it means that the number of mini-slot-based repetitions of the PDSCH in time domain that is configured by the network device is 1, that is, no mini-slot-based repetition exists. When K is greater than 1 (a value of the fourth parameter is greater than 1), it means that the number of mini-slot-based repetitions of the PDSCH in time domain that is configured by the network device is greater than 1 (for example, 2, 4, or 8).

(5) Fifth Parameter

The fifth parameter is the number of demodulation reference signal (DMRS) code division multiplexing (CDM) groups of the PDSCH.

The fifth parameter is generally obtained from antenna port field indication in the DCI scheduling the PDSCH, and a value of the fifth parameter may be 1, greater than 1, or the like.

Optionally, in addition to at least one of the foregoing five parameters, the preset parameter may further include a sixth parameter. The sixth parameter is the maximum number of layers that can be supported by the preset TDM transmission scheme, and a value of the sixth parameter may be equal to 1 or greater than 1. When the value of the sixth parameter is 1, it means that the maximum number of layers that the preset TDM transmission scheme can support for each repetition of the PDSCH in time domain is 1. When the value of the sixth parameter is greater than 1, it means that the maximum number of layers that the preset TDM transmission scheme can support for each repetition of the PDSCH in time domain is greater than 1. For example, the preset TDM transmission scheme may be a first TDM transmission scheme or another TDM transmission scheme that is supported by uRLLC under multiple TRPs, generally represented by scheme 3 and scheme 4 respectively.

Certainly, in addition to the first parameter, the second parameter, the third parameter, the fourth parameter, the fifth parameter, and the sixth parameter, the preset parameter may further include one or more other parameters, but is not limited to at least one of the first parameter to the fifth parameter or at least one of the first parameter to the sixth parameter. That is, in this embodiment of this disclosure, the transmission mode of the PDSCH may also be determined based on a value of a parameter other than the first parameter to the fifth parameter or based on a value of a parameter other than the first parameter to the sixth parameter.

For clearer understanding of the technical solutions provided in this disclosure, the following separately and briefly describes several transmission schemes (scheme 1a, scheme 2a, scheme 2b, scheme 3, and scheme 4) supported by uRLLC under multiple TRPs.

(1) SDM Transmission Scheme (Scheme 1a)

In the SDM transmission scheme, n TCI states are indicated in one slot, and time-frequency resources fully overlap between transmission occasions.

Specifically, each transmission occasion is one layer or a multi-layer set of a same transport block (TB), and the one layer or multi-layer set is associated with one TCI state and one DMRS port or port set (that is, CDM groups of a DMRS). Individual coding codewords of one redundancy version (RV) are mapped to all space layers or a layer set. In terms of UE, different coded bits are mapped to different layers or a layer set according to a mapping rule the same as that defined by the 3GPP NR Rel-15 standard.

(2) FDM Transmission Scheme

In the FDM transmission scheme, n TCI states are indicated in one slot, and frequency-domain resources do not overlap between transmission occasions. Each non-overlapped frequency-domain resource is associated with one TCI state, and all the non-overlapped frequency-domain resources are associated with one or more identical DMRS ports. The FDM supported by uRLLC under multiple TRPs includes the following two specific transmission schemes.

In the first transmission scheme (scheme 2a), all resources are transmitted by using individual coding codewords of one RV. In terms of UE, codewords are mapped to all the resources by using a codeword-to-layer mapping rule the same as that defined by the 3GPP Rel-15 standard.

In the second transmission scheme (scheme 2b), each non-overlapped frequency-domain resource is transmitted by using individual coding codewords of one RV. The RVs corresponding to the non-overlapped frequency-domain resources may be the same or different.

(3) TDM Scheme (Scheme 3)

In the TDM transmission scheme, n TCI states are indicated in one slot, and time-domain resources do not overlap. TBs transmitted in each transmission occasion corresponds to one TCI state and one RV, and transmission is performed at a of mini-slot time-domain granularity in the transmission occasion. All transmission occasions in one slot use a same modulation and coding scheme (MCS) and one or more identical DMRS ports. Multiple transmission occasions may use same or different RVs/TCI states.

(4) TDM Transmission Scheme (Scheme 4)

In the TDM transmission scheme, n (n≤K) TCI states are indicated in K slots, and TBs transmitted in each transmission occasion corresponds to one TCI state and one RV. All transmission occasions in the K slots use a same MCS and one or more identical DMRS ports. Multiple transmission occasions may use same or different RVs/TCI states.

It should be noted that, the foregoing transmission schemes may be combined, for example, scheme 1a and scheme 3 are combined (scheme 1a+scheme 3), and scheme 2b and scheme 4 are combined (scheme 2b+scheme 4). The foregoing transmission schemes supported by uRLLC are also applicable to the eMBB service.

The following are several transmission schemes supported by eMBB under multiple TRPs.

(1) Single-TRP Transmission Scheme

PDSCH is always transmitted to one UE by one TRP. If a pdsch-AggregationFactor field is configured in PDSCH-Config of RRC, a value may be 2, 4, or 8, that is, the first parameter is N=2, 4, or 8. If this field is not configured in PDSCH-Config, it means that no slot-based repetition exists, that is, N=1.

(2) DPS Transmission Scheme

During each PDSCH scheduling, TRPs may be dynamically selected to transmit the PDSCH to one UE. The TRPs for transmission may be dynamically changed by changing a value of a TCI field in DCI. Configuration of slot-based repetition is the same as that in (1).

(3) NCJT Transmission Scheme Scheduled by Multiple DCIs

Multiple PDSCHs are scheduled by multiple DCIs. The DCIs shall include all scheduling information corresponding to the PDSCHs. The multiple scheduled PDSCHs may fully overlap or partially overlap or not overlap in time domain and frequency domain. In a case that the multiple PDSCHs that fully/partially overlap are scheduled for UE, there are some limitations on DMRS configuration and bandwidth part (BWP) activation. Details are not described herein.

(4) NCJT Transmission Scheme Scheduled by One DCI

This scheme is similar to the foregoing CDM transmission scheme supported by uRLLC, that is, scheme 1a.

The following describes the transmission schemes represented by combinations of different values of at least one parameter of the first parameter, the second parameter, the third parameter, the fourth parameter, and the fifth parameter (and the sixth parameter in some cases) with reference to Table 1.

TABLE 1

| Transmission scheme | First parameter (N) | Second parameter | Third parameter (number of TCI states) | Fourth parameter (K) | Fifth parameter (number of CDM groups of DMRS) | Sixth parameter (maximum number of layers supported by scheme 3) | Detailed description |
|---|---|---|---|---|---|---|---|
| 1 | 1 | First value | 1 | 1 | | | One DCI schedules one PDSCH with no repetition in time domain (for example, single TRP or DPS transmission, or one DCI in a transmission scheme of scheduling multiple PDSCHs by multiple DCIs) |
| 2 | 1 | First value | >1, for example, 2 | 1 | >1 | >1 | Scheme 1a with no repetition in time domain |
| 3 | 1 | First value | >1 | >1 | >1 | >1 | Scheme 1a + scheme 3 |
| 4 | 1 | First value | >1 | >1 | 1 | >1 | Scheme 3 |
| 5 = 2 | 1 | First value | >1 | 1 | | =1 | Scheme 1a |
| 6 = 4 | 1 | First value | >1 | >1 | | =1 | Scheme 3 |
| 7 | 1 | Second value | >1 | 1 | | | Scheme 2a |
| 8 | 1 | Second value | >1 | >1 | | | Scheme 2a + scheme 3 |
| 9 | 1 | Third value | >1 | 1 | | | Scheme 2b |
| 10 | 1 | Third value | >1 | >1 | | | Scheme 2b + scheme 3 |
| 11 | >1 | | 1 | | | | One DCI schedules one PDSCH with slot-based repetitions in time domain (for example, single TRP or DPS transmission, or one DCI in a transmission scheme of scheduling multiple PDSCHs by multiple DCIs) |
| 12 | >1 | First value | >1 | 1 | 1 | | Scheme 4 |

TABLE 1-continued

| Transmission scheme | First parameter (N) | Second parameter | Third parameter (number of TCI states) | Fourth parameter (K) | Fifth parameter (number of CDM groups of DMRS) | Sixth parameter (maximum number of layers supported by scheme 3) | Detailed description |
|---|---|---|---|---|---|---|---|
| 13 | >1 | First value | >1 | 1 | >1 | | Scheme 1a + scheme 4 |
| 14 | >1 | Second value | >1 | 1 | | | Scheme 2a + scheme 4 |
| 15 | >1 | Third value | >1 | 1 | | | Scheme 2b + scheme 4 |

It should be noted that, in a case that any of the first parameter to the sixth parameter is not defined in any of the following first to fifteenth conditions, it means that a value of the parameter may be any value, or that the parameter is not considered in determining the transmission scheme of the PDSCH. For example, the following first condition does not specify the fifth parameter and the sixth parameter, meaning that values of the fifth parameter and the sixth parameter may be any values, that is, the value of the fifth parameter may be equal to 1 or greater than 1, or meaning that the transmission scheme of the PDSCH is determined by using four preset parameters including the first parameter, the second parameter, the third parameter, and the fourth parameter, without considering values of the fifth parameter and the sixth parameter.

It can be learned from Table 1 that, the determining, based on a preset parameter included in the first preset information, a transmission scheme of the PDSCH may include at least one of the following determining methods.

(1) When a first condition is met, that is, a value of the first parameter is 1, the value of the second parameter is the first value, a value of the third parameter is 1, and a value of the fourth parameter is 1, determine that the transmission scheme of the PDSCH is a first preset transmission scheme (corresponding to transmission scheme 1 in Table 1).

For example, it can be learned from Table 1 that, the first preset transmission scheme may specifically be that one DCI schedules one PDSCH with no repetition in time domain, for example, single TRP or DPS transmission, or that one DCI in a transmission scheme of scheduling multiple PDSCHs by multiple DCIs schedules one PDSCH.

(2) When a second condition is met, that is, a value of the first parameter is 1, the value of the second parameter is the first value, a value of the third parameter is greater than 1, a value of the fourth parameter is 1, and a value of the fifth parameter is greater than 1, determine that the transmission scheme of the PDSCH is a second preset transmission scheme (corresponding to transmission scheme 2 in Table 1).

Optionally, it can be learned from Table 1 that, the second condition may further include that a value of the sixth parameter is greater than 1, that is, the second condition may further include that the maximum number of layers supported by scheme 3 is greater than 1.

For example, it can be learned from Table 1 that, the second preset transmission scheme may specifically be scheme 1a with no repetition in time domain. For the description of scheme 1a, reference is made to the above description.

(3) When a third condition is met, that is, a value of the first parameter is 1, the value of the second parameter is the first value, a value of the third parameter is greater than 1, a value of the fourth parameter is greater than 1, and a value of the fifth parameter is greater than 1, determine that the transmission scheme of the PDSCH is a third preset transmission scheme (corresponding to transmission scheme 3 in Table 1).

Optionally, it can be learned from Table 1 that, the third condition may further include that a value of the sixth parameter is greater than 1, that is, the third condition may further include that the maximum number of layers supported by scheme 3 is greater than 1.

For example, it can be learned from Table 1 that, the third preset transmission scheme may specifically be a combination of scheme 1a and scheme 3, that is, a combination of the SDM transmission scheme and TDM transmission scheme (K mini-slot-based repetitions) that are supported by uRLLC under multiple TRPs. For the description of scheme 1a and scheme 3, reference is made to the above description.

(4) When a fourth condition is met, that is, a value of the first parameter is 1, the value of the second parameter is the first value, a value of the third parameter is greater than 1, a value of the fourth parameter is greater than 1, and a value of the fifth parameter is 1, determine that the transmission scheme of the PDSCH is a fourth preset transmission scheme (corresponding to transmission scheme 4 in Table 1).

Optionally, it can be learned from Table 1 that, the fourth condition may further include that a value of the sixth parameter is greater than 1, that is, the fourth condition may further include that the maximum number of layers supported by scheme 3 is greater than 1.

For example, it can be learned from Table 1 that, the fourth preset transmission scheme may specifically be scheme 3, that is, a combination of the TDM transmission scheme (K mini-slot-based repetitions) supported by uRLLC under multiple TRPs.

(5) When a fifth condition is met, that is, a value of the first parameter is 1, the value of the second parameter is the first value, a value of the third parameter is greater than 1, and a value of the fourth parameter is 1, determine that the transmission scheme of the PDSCH is a fifth preset transmission scheme (corresponding to transmission scheme 5 in Table 1).

Optionally, it can be learned from Table 1 that, the fifth condition may further include that a value of the sixth parameter is 1, that is, the fifth condition may further include that the maximum number of layers supported by scheme 3 is equal to 1.

For example, it can be learned from Table 1 that, the fifth preset transmission scheme may specifically be scheme 1a. In this case, the fifth preset transmission scheme is the same as the second preset transmission scheme.

(6) When a sixth condition is met, that is, a value of the first parameter is 1, the value of the second parameter is the first value, a value of the third parameter is greater than 1, and a value of the fourth parameter is greater than 1, determine that the transmission scheme of the PDSCH is a sixth preset transmission scheme (corresponding to transmission scheme 6 in Table 1).

Optionally, it can be learned from Table 1 that, the sixth condition may further include that a value of the sixth parameter is 1, that is, the sixth condition may further include that the maximum number of layers supported by scheme 3 is equal to 1.

For example, it can be learned from Table 1 that, the sixth preset transmission scheme may specifically be scheme 3. In this case, the sixth preset transmission scheme is the same as the fourth preset transmission scheme.

(7) When a seventh condition is met, that is, a value of the first parameter is 1, the value of the second parameter is the second value, a value of the third parameter is greater than 1, and a value of the fourth parameter is 1, determine that the transmission scheme of the PDSCH is a seventh preset transmission scheme (corresponding to transmission scheme 7 in Table 1).

For example, it can be learned from Table 1 that, the seventh preset transmission scheme may specifically be scheme 2a. For the description of scheme 2a, reference is made to the above description.

(8) When an eighth condition is met, that is, a value of the first parameter is 1, the value of the second parameter is the second value, a value of the third parameter is greater than 1, and a value of the fourth parameter is greater than 1, determine that the transmission scheme of the PDSCH is an eighth preset transmission scheme (corresponding to transmission scheme 8 in Table 1).

For example, it can be learned from Table 1 that, the eighth preset transmission scheme may specifically be a combination of scheme 2a and scheme 3.

(9) When a ninth condition is met, that is, a value of the first parameter is 1, the value of the second parameter is the third value, a value of the third parameter is greater than 1, and a value of the fourth parameter is 1, determine that the transmission scheme of the PDSCH is a ninth preset transmission scheme (corresponding to transmission scheme 9 in Table 1).

For example, it can be learned from Table 1 that, the ninth preset transmission scheme may specifically be scheme 2b.

(10) When a tenth condition is met, that is, a value of the first parameter is 1, the value of the second parameter is the third value, a value of the third parameter is greater than 1, and a value of the fourth parameter is greater than 1, determine that the transmission scheme of the PDSCH is a tenth preset transmission scheme (corresponding to transmission scheme 10 in Table 1).

For example, it can be learned from Table 1 that, the tenth preset transmission scheme may specifically be a combination of scheme 2b and scheme 3.

(11) When an eleventh condition is met, that is, a value of the first parameter is greater than 1 and a value of the third parameter is 1, determine that the transmission scheme of the PDSCH is an eleventh preset transmission scheme (corresponding to transmission scheme 11 in Table 1).

For example, it can be learned from Table 1 that, the eleventh preset transmission scheme may specifically be that one DCI schedules one PDSCH with no repetition in time domain, for example, single TRP or DPS transmission, or that one DCI in a transmission scheme of scheduling multiple PDSCHs by multiple DCIs schedules one PDSCH.

(12) When a twelfth condition is met, that is, a value of the first parameter is greater than 1, the value of the second parameter is the first value, a value of the third parameter is greater than 1, a value of the fourth parameter is 1, and a value of the fifth parameter is 1, determine that the transmission scheme of the PDSCH is a twelfth preset transmission scheme (corresponding to transmission scheme 12 in Table 1).

For example, it can be learned from Table 1 that, the twelfth preset transmission scheme may specifically be scheme 4.

(13) When a thirteenth condition is met, that is, a value of the first parameter is greater than 1, the value of the second parameter is the first value, a value of the third parameter is greater than 1, a value of the fourth parameter is greater than 1, and a value of the fifth parameter is greater than 1, determine that the transmission scheme of the PDSCH is a thirteenth preset transmission scheme (corresponding to transmission scheme 13 in Table 1).

For example, it can be learned from Table 1 that, the thirteenth preset transmission scheme may specifically be a combination of scheme 1a and scheme 4. Optionally, the TCI states for each transmission are in a one-to-one correspondence with the DMRS CDM groups.

(14) When a fourteenth condition is met, that is, a value of the first parameter is greater than 1, the value of the second parameter is the second value, a value of the third parameter is greater than 1, and a value of the fourth parameter is 1, determine that the transmission scheme of the PDSCH is a fourteenth preset transmission scheme (corresponding to transmission scheme 14 in Table 1).

For example, it can be learned from Table 1 that, the fourteenth preset transmission scheme may specifically be a combination of scheme 2a and scheme 4.

(15) When a fifteenth condition is met, that is, a value of the first parameter is greater than 1, the value of the second parameter is the third value, a value of the third parameter is greater than 1, and a value of the fourth parameter is 1, determine that the transmission scheme of the PDSCH is a fifteenth preset transmission scheme (corresponding to transmission scheme 15 in Table 1).

For example, it can be learned from Table 1 that, the fifteenth preset transmission scheme may specifically be a combination of scheme 2b and scheme 4.

It should be noted that, in addition to the 15 preset transmission schemes correspondingly determined based on the 15 conditions, other conditions may also be set in actual application to determine other preset transmission schemes, without being limited to the above 15 cases.

It can be understood that, in EXAMPLE 1, corresponding conditions may be determined based on a value of the preset parameter (at least one of the first parameter, the second parameter, the third parameter, the fourth parameter, and the fifth parameter) included in the first preset information after the first preset information is received, and then the specific transmission scheme of the PDSCH is determined based on a correspondence between the conditions and the preset transmission schemes.

Example 2

The transmission mode of the PDSCH includes transmission configuration information of the PDSCH, and step 101 may further include: determining, based on the preset parameter, transmission configuration information of the PDSCH. The transmission configuration information may include a transmission configuration indicator (TCI) state.

First implementation of EXAMPLE 2

The transmission configuration information includes TCI states, and the determining, based on the preset parameter, transmission configuration information of the PDSCH may specifically include:

when a value of the first parameter is greater than 1, the value of the second parameter is the first value, a value of the third parameter is greater than 1, and a value of the fourth parameter is 1, determining, based on preset TCI state sequence information, a TCI state for each slot-based repetitive transmission of the PDSCH in time domain.

More specifically, it can be learned from Table 1 and the foregoing description of Table 1 that, the twelfth condition meets the requirement that a value of the first parameter is greater than 1, the value of the second parameter is the first value, a value of the third parameter is greater than 1, and a value of the fourth parameter is 1. That means when it is determined in EXAMPLE 1 that the transmission scheme of the PDSCH is the twelfth preset transmission scheme, that is, when the number of TCI states is greater than 1 and the transmission scheme of the PDSCH is only slot-based repetitive transmission in time domain (for example, scheme 4 under URLLC or a slot-based repetitive transmission scheme under eMBB), a TCI state for each repetitive transmission of the PDSCH in time domain may be determined based on the preset TCI state sequence information.

The preset TCI state sequence information may be configured by the network device or prescribed by a protocol.

For example, the preset TCI state sequence information configured by the network device includes the following TCI state sequence: {TCI1, TCI2, TCI1, TCI2}, where TCI1 represents TCI state 1, and TCI2 represents TCI state 2. If values of TCI states indicated by a TCI field included in the DCI scheduling the PDSCH are 17 and 60, it can be learned that the value of the third parameter is 2, that is, the number of TCI states corresponding to the PDSCH scheduled by the DCI this time is 2. Further, if it is determined that the transmission scheme of the PDSCH is the twelfth preset transmission scheme, and N=8, the first slot-based repetitive transmission of the PDSCH corresponds to TCI state 1, with a TCI state value of 17;

the second slot-based repetitive transmission of the PDSCH corresponds to TCI state 2, with a TCI state value of 60;

the third slot-based repetitive transmission of the PDSCH corresponds to TCI state 1, with a TCI state value of 17;

the fourth slot-based repetitive transmission of the PDSCH corresponds to TCI state 2, with a TCI state value of 60;

repetitive transmissions starting from the fifth slot-based repetitive transmission of the PDSCH cyclically correspond to the TCI state sequence configured by the network: {TCI1, TCI2, TCI1, TCI2}, that is, the fifth slot-based repetitive transmission of the PDSCH corresponds to TCI state 1, with a TCI state value of 17;

the sixth slot-based repetitive transmission of the PDSCH corresponds to TCI state 2, with a TCI state value of 60;

the seventh slot-based repetitive transmission of the PDSCH corresponds to TCI state 1, with a TCI state value of 17; and the eighth slot-based repetitive transmission of the PDSCH corresponds to TCI state 2, with a TCI state value of 60.

Alternatively, the transmission configuration information includes TCI states, and the determining, based on the preset parameter, transmission configuration information of the PDSCH may specifically include:

when a value of the first parameter is 1, the value of the second parameter is the first value, a value of the third parameter is greater than 1, and a value of the fourth parameter is greater than 1, determining, based on preset TCI state sequence information, a TCI state for each mini-slot-based repetitive transmission of the PDSCH in time domain.

More specifically, it can be learned from Table 1 and the foregoing description of Table 1 that, the fourth condition and the sixth condition meet the requirement that a value of the first parameter is 1, the value of the second parameter is the first value, a value of the third parameter is greater than 1, and a value of the fourth parameter is greater than 1. That means when it is determined in EXAMPLE 1 that the transmission scheme of the PDSCH is the fourth preset transmission scheme or the sixth preset transmission scheme, that is, when the number of TCI states is greater than 1 and the transmission scheme of the PDSCH is only mini-slot-based repetition in time domain (for example, scheme 3 under URLLC), a TCI state for each repetitive transmission of the PDSCH in time domain may be determined based on the preset TCI state sequence information.

For example, the preset TCI state sequence information configured by the network device includes the following TCI state sequence: {TCI1, TCI1, TCI2, TCI2}, where TCI1 represents TCI state 1, and TCI2 represents TCI state 2. If values of TCI states indicated by a TCI field included in the DCI scheduling the PDSCH are 17 and 60, it can be learned that the value of the third parameter is 2, that is, the number of TCI states corresponding to the PDSCH scheduled by the DCI this time is 2. Further, if it is determined that the transmission scheme of the PDSCH is the sixth preset transmission scheme, and K=4, the first mini-slot-based repetitive transmission of the PDSCH corresponds to TCI state 1, with a TCI state value of 17;

the second mini-slot-based repetitive transmission of the PDSCH corresponds to TCI state 1, with a TCI state value of 17;

the third mini-slot-based repetitive transmission of the PDSCH corresponds to TCI state 2, with a TCI state value of 60; and the fourth mini-slot-based repetitive transmission of the PDSCH corresponds to TCI state 2, with a TCI state value of 60.

Optionally, in the first implementation of EXAMPLE 2, before the determining, based on the preset parameter, transmission configuration information of the PDSCH, the method in FIG. 1 may further include: receiving second preset information from the network device, where the second preset information is used for configuring the preset TCI state sequence information; and determining, based on the second preset information, the preset TCI state sequence information.

The second preset information may be RRC or an MAC CE.

When the preset TCI state sequence information configured by the network device only includes one TCI state sequence, a TCI state for each slot-based or mini-slot-based repetitive transmission of the PDSCH in time domain may be directly determined by using the TCI state sequence. For example, the number of slot-based repetitions satisfies N=4, and the preset TCI state sequence information includes one TCI state sequence: {TCI1, TCI2, TCI1, TCI2}, where TCI1 represents TCI state 1, and TCI2 represents TCI state 2. If values of TCI states indicated by a TCI field included in the DCI scheduling the PDSCH are 17 and 60, it can be learned that the value of the third parameter is 2, that is, the number of TCI states corresponding to the PDSCH scheduled by the DCI this time is 2. In the case of repetitive reception of the PDSCH in time domain, the first mini-slot-based repetitive transmission of the PDSCH corresponds to TCI state 1, with a TCI state value of 17;

the second mini-slot-based repetitive transmission of the PDSCH corresponds to TCI state 2, with a TCI state value of 60;

the third mini-slot-based repetitive transmission of the PDSCH corresponds to TCI state 1, with a TCI state value of 17; and the fourth mini-slot-based repetitive transmission of the PDSCH corresponds to TCI state 2, with a TCI state value of 60.

When the preset TCI state sequence information configured by the network device includes multiple TCI state sequences, the method in FIG. 1 may further include: receiving third preset information from the network device, where the third preset information is used to indicate a target TCI state sequence, and the target TCI state sequence is one of the multiple TCI state sequences. The third preset information may be a MAC CE.

Correspondingly, the determining, based on preset TCI state sequence information, a TCI state for each slot-based repetitive transmission of the PDSCH in time domain includes: determining, based on the target TCI state sequence, a TCI state for each slot-based repetitive transmission of the PDSCH in time domain Correspondingly, the determining, based on preset TCI state sequence information, a TCI state for each mini-slot-based repetitive transmission of the PDSCH in time domain includes: determining, based on the target TCI state sequence, a TCI state for each mini-slot-based repetitive transmission of the PDSCH in time domain For example, if the number of slot-based or mini-slot-based repetitive transmissions is 4 (N=4 or K=4), the preset TCI state sequence information configured by the network device includes the following four TCI state sequences:

{TCI1, TCI2, TCI1, TCI2},
{TCI1, TCI1, TCI2, TCI2},
{TCI1, TCI2, TCI2, TCI2}, and
{TCI1, TCI1, TCI1, TCI2}.

TCI1 represents TCI state 1, and TCI2 represents TCI state 2. If the network device further indicates the first sequence ({TCI1, TCI2, TCI1, TCI2}) by using the MAC CE, the first sequence is used as the target TCI state sequence, that is, {TCI1, TCI2, TCI1, TCI2} is used as the target TCI state sequence.

Second implementation of EXAMPLE 2

The transmission configuration information includes TCI states, and the determining, based on the preset parameter, transmission configuration information of the PDSCH may specifically include:

when a value of the first parameter is greater than 1, the value of the second parameter is the second value, and a value of the third parameter is greater than 1, determining that multiple TCI states indicated by a same DCI are used for each repetitive transmission of the PDSCH in time domain.

For example, when the fourteenth condition is met and the transmission scheme of the PDSCH is the fourteenth preset transmission scheme (for example, scheme 2a+scheme 4 under URLLC), it is determined that multiple TCI states indicated by a same DCI are used for each repetitive transmission of the PDSCH in time domain Specifically, if values of TCI states indicated by a TCI field included in the DCI scheduling the PDSCH are 17 and 60, it can be learned that the value of the third parameter is 2, that is, the number of TCI states corresponding to the PDSCH scheduled by the DCI this time is 2. Further, if it is determined that the transmission scheme of the PDSCH is the fourteenth preset transmission scheme, and N=4, the transmission scheme for each slot-based repetition of the PDSCH is scheme 2a, corresponding to TCI state 1 and TCI state 2, with TCI state values of 17 and 60, respectively.

Alternatively, the transmission configuration information includes TCI states, and the determining, based on the preset parameter, transmission configuration information of the PDSCH may specifically include:

when a value of the first parameter is greater than 1, the value of the second parameter is the third value, and a value of the third parameter is greater than 1, determining that multiple TCI states indicated by a same DCI are used for each repetitive transmission of the PDSCH in time domain.

For example, when the fifteenth condition is met and the transmission scheme of the PDSCH is the fifteenth preset transmission scheme (for example, scheme 2b+scheme 4 under URLLC), it is determined that multiple TCI states indicated by a same DCI are used for each repetitive transmission of the PDSCH in time domain.

Specifically, if values of TCI states indicated by a TCI field included in the DCI scheduling the PDSCH are 17 and 60, it can be learned that the value of the third parameter is 2, that is, the number of TCI states corresponding to the PDSCH scheduled by the DCI this time is 2. Further, if it is determined that the transmission scheme of the PDSCH is the fifteenth preset transmission scheme, and N=4, the transmission scheme for each slot-based repetitive transmission of the PDSCH is scheme 2b, corresponding to TCI state 1 and TCI state 2, with TCI state values of 17 and 60, respectively.

Alternatively, the transmission configuration information includes TCI states, and the determining, based on the preset parameter, transmission configuration information of the PDSCH may specifically include:

when the value of the second parameter is the second value, a value of the third parameter is greater than 1, and a value of the fourth parameter is greater than 1, determining that multiple TCI states indicated by a same DCI are used for each repetitive transmission of the PDSCH in time domain.

For example, when the eighth condition is met and the transmission scheme of the PDSCH is the eighth preset transmission scheme (for example, scheme 2a+scheme 3 under URLLC), it is determined that multiple TCI states indicated by a same DCI are used for each repetitive transmission of the PDSCH in time domain Specifically, if values of TCI states indicated by a TCI field included in the DCI scheduling the PDSCH are 17 and 60, it can be learned that the value of the third parameter is 2, that is, the number of TCI states corresponding to the PDSCH scheduled by the DCI this time is 2. Further, if it is determined that the transmission scheme of the PDSCH is the eighth preset transmission scheme, and K=4, the transmission scheme for each mini-slot-based repetition of the PDSCH is scheme 2a, corresponding to TCI state 1 and TCI state 2, with TCI state values of 17 and 60, respectively.

Alternatively, the transmission configuration information includes TCI states, and the determining, based on the preset parameter, transmission configuration information of the PDSCH may specifically include:

when the value of the second parameter is the third value, a value of the third parameter is greater than 1, and a value of the fourth parameter is greater than 1, determining that multiple TCI states indicated by a same DCI are used for each repetitive transmission of the PDSCH in time domain.

For example, when the tenth condition is met and the transmission scheme of the PDSCH is the tenth preset transmission scheme (for example, scheme 2b+scheme 3 under URLLC), it is determined that multiple TCI states indicated by a same DCI are used for each repetitive transmission of the PDSCH in time domain Specifically, if values of TCI states indicated by a TCI field included in the DCI scheduling the PDSCH are 17 and 60, it can be learned that the value of the third parameter is 2, that is, the number of TCI states corresponding to the PDSCH scheduled by the DCI this time is 2. Further, if it is determined that the transmission scheme of the PDSCH is the tenth preset transmission scheme, and K=4, the transmission scheme of each mini-slot-based repetition of the PDSCH is scheme 2b, corresponding to TCI state 1 and TCI state 2, with TCI state values of 17 and 60, respectively.

The second implementation of EXAMPLE 2 is intended to illustrate that when the transmission scheme of the PDSCH is a combination of a frequency-domain transmission scheme (scheme 2a/2b) and a designated scheme (scheme 3/4), it is determined that multiple TCI states indicated by a same DCI are used for each repetitive transmission of the PDSCH in time domain.

Third implementation of EXAMPLE 2

The transmission configuration information includes TCI states, and the determining, based on the preset parameter, transmission configuration information of the PDSCH may specifically include:

when a value of the first parameter is 1, the value of the second parameter is the first value, a value of the third parameter is greater than 1, a value of the fourth parameter is 1, and a value of the fifth parameter is greater than 1, determining that the TCI states for each repetitive transmission of the PDSCH in time domain correspond to the DMRS CDM groups in the fifth parameter.

For example, when the second condition or the fifth condition is met and the transmission scheme of the PDSCH is the second preset transmission scheme (for example, scheme 1a under URLLC) or the fifth preset transmission scheme (for example, scheme 1a under URLLC), it is determined that the TCI states for each repetitive transmission of the PDSCH in time domain correspond to the DMRS CDM groups in the fifth parameter.

Alternatively, the transmission configuration information includes TCI states, and the determining, based on the preset parameter, transmission configuration information of the PDSCH may specifically include:

when a value of the first parameter is 1, the value of the second parameter is the first value, a value of the third parameter is greater than 1, a value of the fourth parameter is greater than 1, and a value of the fifth parameter is greater than 1, determining that the TCI states for each repetitive transmission of the PDSCH in time domain correspond to the DMRS CDM groups in the fifth parameter.

For example, when the third condition is met and the transmission scheme of the PDSCH is the third preset transmission scheme (for example, scheme 1a+scheme 3 under URLLC), it is determined that the TCI states for each repetitive transmission of the PDSCH in time domain correspond to the DMRS CDM groups in the fifth parameter.

Alternatively, the transmission configuration information includes TCI states, and the determining, based on the preset parameter, transmission configuration information of the PDSCH may specifically include:

when a value of the first parameter is greater than 1, the value of the second parameter is the first value, a value of the third parameter is greater than 1, a value of the fourth parameter is 1, and a value of the fifth parameter is greater than 1, determining that the TCI states for each repetitive transmission of the PDSCH in time domain correspond to the DMRS CDM groups in the fifth parameter.

For example, when the thirteenth condition is met and the transmission scheme of the PDSCH is the thirteenth preset transmission scheme (for example, scheme 1a+scheme 4 under URLLC), it is determined that the TCI states for each repetitive transmission of the PDSCH in time domain correspond to the DMRS CDM groups in the fifth parameter.

In the third implementation of EXAMPLE 2, a correspondence between the TCI states for each repetitive transmission of the PDSCH in time domain and the DMRS CDM groups in the fifth parameter may be configured (or indicated) by a network, or a correspondence between the TCI states for the PDSCH and the DMRS CDM groups in the fifth parameter is a preset one-to-one correspondence by default.

The third implementation of EXAMPLE 2 is intended to illustrate that when a value of the fifth parameter is greater than 1, multiple TCI states correspond to CDM groups of a DMRS corresponding to the fifth parameter in the DCI.

For example, if values of TCI states indicated by a TCI field included in the DCI scheduling the PDSCH are 17 and 60, it can be learned that the value of the third parameter is 2, that is, the number of TCI states corresponding to the PDSCH scheduled by the DCI this time is 2. Further, if it is determined that the transmission scheme of the PDSCH is the second preset transmission scheme, the third preset transmission scheme, the fifth preset transmission scheme, or the thirteenth preset transmission scheme, the transmission scheme of the PDSCH with no repetition in time domain or for each repetition (including slot-based repetition or mini-slot-based repetition) of the PDSCH in time domain is scheme 1a. In a case of two DMRS CDM groups, the DMRS CDM group 1 and the DMRS CDM group 2 by default correspond to TCI state 1 and TCI state 2 respectively, with TCI state values of 17 and 60, respectively.

Fourth implementation of EXAMPLE 2

The transmission configuration information includes TCI states, and the determining, based on the preset parameter, transmission configuration information of the PDSCH may specifically include:

when a value of the first parameter is 1, the value of the second parameter is the second value, a value of the third parameter is greater than 1, and a value of the fourth parameter is 1, determining that the TCI states for each repetitive transmission of the PDSCH in time domain correspond to multiple frequency-domain resources.

For example, when the seventh condition is met and the transmission scheme of the PDSCH is the seventh preset transmission scheme (for example, scheme 2a under URLLC), it is determined that the TCI states for each repetitive transmission of the PDSCH in time domain correspond to multiple frequency-domain resources.

Alternatively, the transmission configuration information includes TCI states, and the determining, based on the preset parameter, transmission configuration information of the PDSCH may specifically include:

when a value of the first parameter is 1, the value of the second parameter is the second value, a value of the third parameter is greater than 1, and a value of the fourth parameter is greater than 1, determining that the TCI states for each repetitive transmission of the PDSCH in time domain correspond to multiple frequency-domain resources.

For example, when the eighth condition is met and the transmission scheme of the PDSCH is the eighth preset transmission scheme (for example, scheme 2a+scheme 3 under URLLC), it is determined that the TCI states for each repetitive transmission of the PDSCH in time domain correspond to multiple frequency-domain resources.

Alternatively, the transmission configuration information includes TCI states, and the determining, based on the preset parameter, transmission configuration information of the PDSCH may specifically include:

when a value of the first parameter is 1, the value of the second parameter is the third value, a value of the third parameter is greater than 1, and a value of the fourth parameter is 1, determining that the TCI states for each repetitive transmission of the PDSCH in time domain correspond to multiple frequency-domain resources.

For example, when the ninth condition is met and the transmission scheme of the PDSCH is the ninth preset transmission scheme (for example, scheme 2b under URLLC), it is determined that the TCI states for each repetitive transmission of the PDSCH in time domain correspond to multiple frequency-domain resources.

Alternatively, the transmission configuration information includes TCI states, and the determining, based on the preset parameter, transmission configuration information of the PDSCH may specifically include:

when a value of the first parameter is 1, the value of the second parameter is the third value, a value of the third parameter is greater than 1, and a value of the fourth parameter is greater than 1, determining that the TCI states for each repetitive transmission of the PDSCH in time domain correspond to multiple frequency-domain resources.

For example, when the tenth condition is met and the transmission scheme of the PDSCH is the tenth preset transmission scheme (for example, scheme 2b+scheme 3 under URLLC), it is determined that the TCI states for each repetitive transmission of the PDSCH in time domain correspond to multiple frequency-domain resources.

Alternatively, the transmission configuration information includes TCI states, and the determining, based on the preset parameter, transmission configuration information of the PDSCH may specifically include:

when a value of the first parameter is greater than 1, the value of the second parameter is the second value, a value of the third parameter is greater than 1, and a value of the fourth parameter is 1, determining that the TCI states for each repetitive transmission of the PDSCH in time domain correspond to multiple frequency-domain resources.

For example, when the fourteenth condition is met and the transmission scheme of the PDSCH is the fourteenth preset transmission scheme (for example, scheme 2a+scheme 4 under URLLC), it is determined that the TCI states for each repetitive transmission of the PDSCH in time domain correspond to multiple frequency-domain resources.

Alternatively, the transmission configuration information includes TCI states, and the determining, based on the preset parameter, transmission configuration information of the PDSCH may specifically include:

when a value of the first parameter is greater than 1, the value of the second parameter is the third value, a value of the third parameter is greater than 1, and a value of the fourth parameter is 1, determining that the TCI states for each repetitive transmission of the PDSCH in time domain correspond to multiple frequency-domain resources.

For example, when the fifteenth condition is met and the transmission scheme of the PDSCH is the fifteenth preset transmission scheme (for example, scheme 2b+scheme 4 under URLLC), it is determined that the TCI states for each repetitive transmission of the PDSCH in time domain correspond to multiple frequency-domain resources.

In the fourth implementation of EXAMPLE 2, the multiple frequency-domain resources may be multiple frequency-domain resources allocated in FDM. A correspondence between the TCI states for the PDSCH and the DMRS CDM groups in the fifth parameter is configured by the network device, or a correspondence between the TCI states for the PDSCH and the DMRS CDM groups in the fifth parameter is a preset one-to-one correspondence by default.

The fourth implementation of EXAMPLE 2 is intended to illustrate that when the transmission scheme of the PDSCH includes scheme 2a/2b, the multiple TCI states correspond to the configured or indicated multiple frequency-domain resources.

For example, if TCI values of states indicated by a TCI field included in the DCI scheduling the PDSCH are 17 and 60, it can be learned that the value of the third parameter is 2, that is, the number of TCI states corresponding to the PDSCH scheduled by the DCI this time is 2. Further, if it is determined that the transmission scheme of the PDSCH is the seventh preset transmission scheme, the eighth preset transmission scheme, the ninth preset transmission scheme, the tenth preset transmission scheme, the fourteenth preset transmission scheme, or the fifteenth preset transmission scheme, the transmission scheme of the PDSCH with no repetition in time domain or for each repetition (including slot-based repetition or mini-slot-based repetition) of the PDSCH in time domain is scheme 2a or scheme 2b. A frequency-domain resource 1 and a frequency-domain resource 2 allocated to two transmission occasions respectively correspond to TCI state 1 and TCI state 2, with TCI state values of 17 and 60, respectively.

The transmission mode determining method provided in this disclosure can determine, based on a preset parameter included in at least one of RRC, a MAC CE, and DCI scheduling a PDSCH, a transmission scheme of the PDSCH, so that the PDSCH can be correctly received. In addition, the transmission mode of the PDSCH can be implemented without changing the DCI scheduling the PDSCH or by slightly changing the DCI scheduling the PDSCH, so that when a code point in one DCI can indicate multiple DCI states, the transmission scheme of the PDSCH and the TCI states used by the transmission scheme can be well determined, thereby improving communication reliability.

The foregoing describes the transmission mode determining method applied to the terminal device. The following describes an information configuration method provided in an embodiment of this disclosure with reference to FIG. 2.

As shown in FIG. 2, this disclosure provides an information configuration method, applied to a network device. The method may include the following step.

S201: Send fourth present information to a terminal device; where the fourth preset information is used for configuring a second parameter, the second parameter is a frequency-domain division mode for a physical downlink shared channel PDSCH, and the second parameter is used by the terminal device to determine a transmission mode of the PDSCH.

The fourth preset information may be carried in any one of RRC, a MAC CE, and DCI. Optionally, the fourth preset information is carried in the RRC.

A value of the second parameter is one of a first value, a second value, and a third value, where the first value indicates that the frequency-domain division mode for the PDSCH is a first preset mode, where the first preset mode is a division mode that does not use a frequency division multiplexing FDM transmission scheme;

the second value indicates that the frequency-domain division mode for the PDSCH is a second preset mode, where the second preset mode is a division mode in a preset frequency division multiplexing FDM transmission scheme; and the third value indicates that the frequency-domain division mode for the PDSCH is a third preset mode, where the third preset mode is another division mode in the preset FDM scheme.

According to the information configuration method provided in this embodiment of this disclosure, the second parameter can be set for the terminal device, to help the terminal device determine the transmission mode of the PDSCH, thereby improving communication reliability.

The foregoing describes the information configuration method applied to the network device. The following describes the terminal device and the network device provided in this disclosure in detail with reference to FIG. 3 and FIG. 4.

FIG. 3 is a schematic structural diagram of an embodiment of a terminal device according to this disclosure. As shown in FIG. 3, the terminal device 300 may include: a transmission mode determining module 301.

The transmission mode determining module 301 is configured to determine, based on first preset information, a transmission mode of a physical downlink shared channel PSDCH scheduled by one downlink control information DCI; where the first preset information is carried in at least one of radio resource control RRC, a media access control control element MAC CE, and the DCI.

For example, the transmission mode of the PDSCH may include but is not limited to: at least one of a transmission scheme and transmission configuration information. For example, the transmission scheme is a transmission scheme such as frequency division multiplexing FDM, TDM, or SDM; and the transmission configuration information includes TCI state information, and the like.

Example 1

The transmission mode of the PDSCH includes the transmission scheme of the PDSCH. Correspondingly, the transmission mode determining module 301 may be configured to determine, based on a preset parameter included in the first preset information, a transmission scheme of the PDSCH; where the preset parameter includes at least one of a first parameter, a second parameter, a third parameter, a fourth parameter, and a fifth parameter.

For the description of the five parameters, reference is made to the above description. Details are not described herein again.

In addition, a specific manner in which the transmission mode determining module 301 determines, based on a value of at least one parameter of the first parameter, the second parameter, the third parameter, the fourth parameter, and the fifth parameter (and a sixth parameter in some cases), a transmission scheme of the PDSCH may be, without limitation to, at least one of the 15 manners described above. Details are not described herein again.

Example 2

The transmission mode of the PDSCH includes transmission configuration information of the PDSCH. Correspondingly, the transmission mode determining module 301 may be further configured to determine, based on the preset parameter, transmission configuration information of the PDSCH. The transmission configuration information may include TCI states.

First implementation of EXAMPLE 2

The transmission configuration information includes TCI states, and the transmission mode determining module 301 may be specifically configured to:

when a value of the first parameter is greater than 1, the value of the second parameter is the first value, a value of the third parameter is greater than 1, and a value of the fourth parameter is 1, determine, based on preset TCI state sequence information, a TCI state for each slot-based repetitive transmission of the PDSCH in time domain; or when a value of the first parameter is 1, the value of the second parameter is the first value, a value of the third parameter is greater than 1, and a value of the fourth parameter is greater than 1, determine, based on preset TCI state sequence information, a TCI state for each mini-slot-based repetitive transmission of the PDSCH in time domain.

Optionally, in the first implementation of EXAMPLE 2, the terminal device 300 in FIG. 3 may further include: a first receiving module, configured to receive second preset information from the network device, where the second preset information is used for configuring the preset TCI state sequence information; and a TCI state sequence information determining module, configured to determine, based on the second preset information, the preset TCI state sequence information.

Optionally, when the preset TCI state sequence information configured by the network device includes only one TCI state sequence, the transmission mode determining module 301 may directly determine a TCI state for each slot-based or mini-slot-based repetitive transmission of the PDSCH in time domain by using the TCI state sequence.

Optionally, when the preset TCI state sequence information configured by the network device includes multiple TCI state sequences, the terminal device 300 in FIG. 3 may further include: a second receiving module, configured to receive third preset information from the network device, where the third preset information is used to indicate a target TCI state sequence, and the target TCI state sequence is one of the multiple TCI state sequences. The third preset information may be a MAC CE.

Correspondingly, the transmission mode determining module 301 may be specifically configured to:

determine, based on the target TCI state sequence, a TCI state for each slot-based repetitive transmission of the PDSCH in time domain; or determine, based on the target TCI state sequence, a TCI state for each mini-slot-based repetitive transmission of the PDSCH in time domain Second implementation of EXAMPLE 2

The transmission configuration information includes TCI states, and the transmission mode determining module 301 may be specifically configured to:

when a value of the first parameter is greater than 1, the value of the second parameter is the second value, and a value of the third parameter is greater than 1, determine that multiple TCI states indicated by a same DCI are used for each repetitive transmission of the PDSCH in time domain; or when a value of the first parameter is greater than 1, the value of the second parameter is the third value, and a value of the third parameter is greater than 1, determine that multiple TCI states indicated by a same DCI are used for each repetitive transmission of the PDSCH in time domain; or when the value of the second parameter is the second value, a value of the third parameter is greater than 1, and a value of the fourth parameter is greater than 1, determine that multiple TCI states indicated by a same DCI are used for each repetitive transmission of the PDSCH in time domain; or when the value of the second parameter is the third value, a value of the third parameter is greater than 1, and a value of the fourth parameter is greater than 1, determine that multiple TCI states indicated by a same DCI are used for each repetitive transmission of the PDSCH in time domain.

The second implementation of EXAMPLE 2 is intended to illustrate that when the transmission scheme of the PDSCH is a combination of a frequency-domain transmission scheme (scheme 2a/2b) and a designated scheme (scheme 3/4), it is determined that multiple TCI states indicated by a same DCI are used for each repetitive transmission of the PDSCH in time domain.

Third implementation of EXAMPLE 2

The transmission configuration information includes TCI states, and the transmission mode determining module 301 may be specifically configured to:

when a value of the first parameter is 1, the value of the second parameter is the first value, a value of the third parameter is greater than 1, a value of the fourth parameter is 1, and a value of the fifth parameter is greater than 1, determine that the TCI states for each repetitive transmission of the PDSCH in time domain correspond to the DMRS CDM groups in the fifth parameter; or when a value of the first parameter is 1, the value of the second parameter is the first value, a value of the third parameter is greater than 1, a value of the fourth parameter is greater than 1, and a value of the fifth parameter is greater than 1, determine that the TCI states for each repetitive transmission of the PDSCH in time domain correspond to the DMRS CDM groups in the fifth parameter; or when a value of the first parameter is greater than 1, the value of the second parameter is the first value, a value of the third parameter is greater than 1, a value of the fourth parameter is 1, and a value of the fifth parameter is greater than 1, determine that the TCI states for each repetitive transmission of the PDSCH in time domain correspond to the DMRS CDM groups in the fifth parameter.

In the third implementation of EXAMPLE 2, a correspondence between the TCI states for each repetitive transmission of the PDSCH in time domain and the DMRS CDM groups in the fifth parameter may be configured (or indicated) by a network, or a correspondence between the TCI states for the PDSCH and the DMRS CDM groups in the fifth parameter is a preset one-to-one correspondence by default.

The third implementation of EXAMPLE 2 is intended to illustrate that when a value of the fifth parameter is greater than 1, multiple TCI states correspond to CDM groups of a DMRS corresponding to the fifth parameter in the DCI.

Fourth implementation of EXAMPLE 2

The transmission configuration information includes TCI states, and the transmission mode determining module 301 may be specifically configured to:

when a value of the first parameter is 1, the value of the second parameter is the second value, a value of the third parameter is greater than 1, and a value of the fourth parameter is 1, determine that the TCI states for each repetitive transmission of the PDSCH in time domain correspond to multiple frequency-domain resources; or when a value of the first parameter is 1, the value of the second parameter is the second value, a value of the third parameter is greater than 1, and a value of the fourth parameter is greater than 1, determine that the TCI states for each repetitive transmission of the PDSCH in time domain correspond to multiple frequency-domain resources; or when a value of the first parameter is 1, the value of the second parameter is the third value, a value of the third parameter is greater than 1, and a value of the fourth parameter is 1, determine that the TCI states for each repetitive transmission of the PDSCH in time domain correspond to multiple frequency-domain resources; or when a value of the first parameter is 1, the value of the second parameter is the third value, a value of the third parameter is greater than 1, and a value of the fourth parameter is greater than 1, determine that the TCI states for each repetitive transmission of the PDSCH in time domain correspond to multiple frequency-domain resources; or when a value of the first parameter is greater than 1, the value of the second parameter is the second value, a value of the third parameter is greater than 1, and a value of the fourth parameter is 1, determine that the TCI states for each repetitive transmission of the PDSCH in time domain correspond to multiple frequency-domain resources; or when a value of the first parameter is greater than 1, the value of the second parameter is the third value, a value of the third parameter is greater than 1, and a value of the fourth parameter is 1, determine that the TCI states for each repetitive transmission of the PDSCH in time domain correspond to multiple frequency-domain resources.

In the fourth implementation of EXAMPLE 2, the multiple frequency-domain resources may be multiple frequency-domain resources allocated in FDM. A correspondence between the TCI states for the PDSCH and the DMRS CDM groups in the fifth parameter is configured by the network device, or a correspondence between the TCI states for the PDSCH and the DMRS CDM groups in the fifth parameter is a preset one-to-one correspondence by default.

The fourth implementation of EXAMPLE 2 is intended to illustrate that when the transmission scheme of the PDSCH includes scheme 2a/2b, the multiple TCI states correspond to the configured or indicated multiple frequency-domain resources.

The terminal device 300 provided in this disclosure can determine, based on a preset parameter included in at least one of RRC, a MAC CE, and DCI scheduling a PDSCH, a transmission scheme of the PDSCH, so that the PDSCH can be correctly received. In addition, the transmission mode of the PDSCH can be implemented without changing the DCI scheduling the PDSCH or by slightly changing the DCI scheduling the PDSCH, so that when a code point in one DCI can indicate multiple DCI states, the transmission scheme of the PDSCH and the TCI states used by the transmission scheme can be well determined, thereby improving communication reliability.

The terminal device 300 shown in FIG. 3 may be used to implement the embodiments of the transmission mode determining method shown in FIG. 1. For related details, refer to the foregoing method embodiments.

The foregoing describes the terminal device 300. The following describes a network device 400 provided in this disclosure with reference to FIG. 4.

FIG. 4 is a schematic structural diagram of an embodiment of a network device according to this disclosure. As shown in FIG. 4, the network device 400 may include: a sending module 401.

The sending module 401 is configured to send fourth preset information to a terminal device; where the fourth preset information is used for configuring a second parameter, the second parameter is a frequency-domain division mode for a physical downlink shared channel PDSCH, and the second parameter is used by the terminal device to determine a transmission mode of the PDSCH.

The fourth preset information may be carried in any one of RRC, a MAC CE, and DCI. Optionally, the fourth preset information is carried in the RRC.

A value of the second parameter is one of a first value, a second value, and a third value, where the first value indicates that the frequency-domain division mode for the PDSCH is a first preset mode, where the first preset mode is a division mode that does not use a frequency division multiplexing FDM transmission scheme;

the second value indicates that the frequency-domain division mode for the PDSCH is a second preset mode, where the second preset mode is a division mode in a preset frequency division multiplexing FDM transmission scheme; and the third value indicates that the frequency-domain division mode for the PDSCH is a third preset mode, where the third preset mode is another division mode in the preset FDM scheme.

The network device 400 provided in this disclosure can configure the second parameter for the terminal device, to help the terminal device determine the transmission mode of the PDSCH, thereby improving communication reliability.

The network device 400 shown in FIG. 4 may be configured to implement all the embodiments of the information configuration method shown in FIG. 2. For related details, refer to the foregoing method embodiments.

FIG. 5 is a schematic structural diagram of another embodiment of a terminal device according to this disclosure. The terminal device 500 shown in FIG. 5 includes at least one processor 501, a memory 502, at least one network interface 504, and a user interface 503. The components in the terminal device 500 are coupled together through a bus system 505. It can be understood that the bus system 505 is configured to implement connection and communication between these components. In addition to a data bus, the bus system 505 further includes a power bus, a control bus, and a status signal bus. However, for clarity of description, various buses are marked as the bus system 505 in FIG. 5.

The user interface 503 may include a display, a keyboard, a pointing device (for example, a mouse or a trackball), a touch panel or a touchscreen, and the like.

It can be understood that the memory 502 in this embodiment of this disclosure may be a volatile memory or a non-volatile memory, or may include both a volatile memory and a non-volatile volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), which is used as an external cache. By way of example but not restrictive description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synch link dynamic random access memory (Synch Link DRAM, SLDRAM), and a direct rambus random access memory (Direct Rambus RAM, DRRAM). The memory 502 in the terminal device 500 described in this embodiment of this disclosure is intended to include but is not limited to these and any other suitable types of memories.

In some implementations, the memory 502 stores the following elements: executable modules or data structures, or a subset thereof, or an extended set thereof: an operating system 5021 and an application program 5022.

The operating system 5021 includes various system programs, such as a framework layer, a core library layer, and a driver layer, and is used to implement various basic services and processing hardware-based tasks. The application program 5022 includes various application programs, such as a media player and a browser, and is used to implement various application services. A program for implementing the method in the embodiments of this disclosure may be included in the application program 5022.

In this embodiment of this disclosure, the terminal device 500 further includes: a computer program stored in the memory 502 and capable of running on the processor 501, where when the computer program is executed by the processor 501, various processes of the transmission mode determining method are implemented, with the same technical effect achieved. Details are not described herein again to avoid repetition.

The methods disclosed in the foregoing embodiments of this disclosure may be applied to the processor 501, or may be implemented by the processor 501. The processor 501 may be an integrated circuit chip, having a signal processing capability. During implementation, the steps of the foregoing method may be completed by hardware integrated logic circuits in the processor 501 or instructions in the form of software. The processor 501 may be a general-purpose processor, a digital signal processor (DSP), an application-specific integrated circuit (ASIC), a field programmable gate array (FPGA) or other programmable logic devices, discrete gates or transistor logic devices, or discrete hardware components. The processor may implement or perform the methods, steps, and logical block diagrams that are disclosed in the embodiments of this disclosure. The general-purpose processor may be a microprocessor, or the processor may be any conventional processor, or the like. Steps of the methods disclosed with reference to the embodiments of this disclosure may be directly performed and completed by using a hardware decoding processor, or may be performed and completed by using a combination of hardware and a software module in a decoding processor. The software module may be located in a computer-readable storage medium that is mature in the art, such as a random access memory, a flash memory, a read-only memory, a programmable read-only memory or electrically erasable programmable memory, or a register. The computer-readable storage medium is located in the memory 502, and the processor 501 reads information in the memory 502, and completes the steps of the foregoing method in combination with its hardware. Specifically, the computer-readable storage medium stores a computer program, and when the computer program is executed by the processor 501, the steps in the foregoing embodiments of the transmission mode determining method are implemented.

Figure 6:
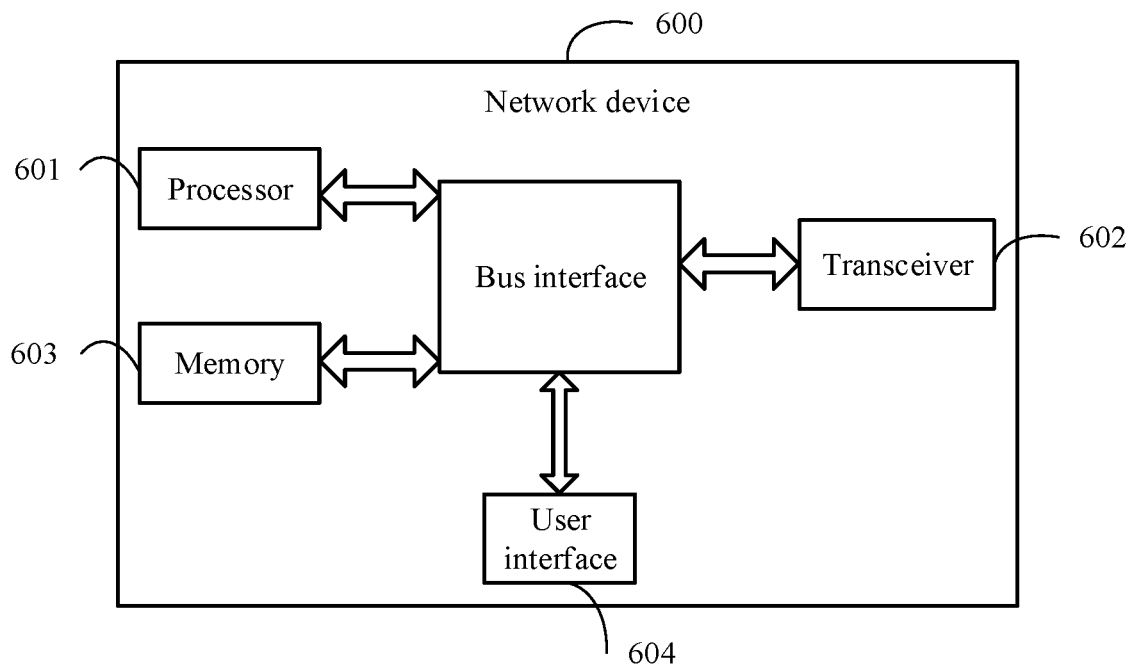
FIG. 6 is a schematic structural diagram of another embodiment of a network device according to this disclosure.

FIG. 6 is a structural diagram of a network device according to an embodiment of this disclosure. Details of the information configuration method can be implemented to achieve same effects. As shown in FIG. 6, the network device 600 includes: a processor 601, a transceiver 602, a memory 603, a user interface 604, and a bus interface.

In this embodiment of this disclosure, the network device 600 further includes: a computer program stored in the memory 603 and capable of running on the processor 601, where when the computer program is executed by the processor 601, various processes of the information configuration method are implemented, with the same technical effect achieved. Details are not described herein again to avoid repetition.

In FIG. 6, a bus architecture may include any quantity of interconnected buses and bridges, and specifically interconnects various circuits of at least one processor represented by the processor 601 and of a memory represented by the memory 603. The bus architecture may further interconnect various other circuits of a peripheral device, a voltage regulator, a power management circuit, and the like. These are all common sense in the art, and therefore are not further described in this specification. The bus interface provides an interface. The transceiver 602 may include a plurality of components: a transmitter and a receiver, to provide a unit for communicating with various other apparatuses on a transmission medium. For different terminal devices, the user interface 604 may also be an interface that can be externally or internally connected to a required device. The connected device includes but is not limited to a keypad, a display, a speaker, a microphone, a joystick, and the like.

The processor 601 is responsible for management of the bus architecture and general processing, and the memory 603 may store data that is used when the processor 601 performs operation.

It can be understood that the embodiments described in this disclosure may be implemented by hardware, software, firmware, middleware, microcode, or a combination thereof. For hardware implementation, the processor unit can be implemented in at least one application-specific integrated circuit (ASIC), a digital signal processor (DSP), a digital signal processing device (DSP Device, DSPD), a programmable logic device (PLD), a field-programmable gate array (FPGA), a general-purpose processor, a controller, a microcontroller, a microprocessor, and other electronic units for implementing the functions described in this disclosure, or a combination thereof.

For software implementation, the techniques described in the embodiments of this disclosure may be implemented by modules (for example, procedures or functions) that implement the functions described in the embodiments of this disclosure. Software codes may be stored in the memory and executed by the processor. The memory may be implemented inside the processor or outside the processor.

An embodiment of this disclosure further provides a computer-readable storage medium. The computer-readable storage medium stores a computer program, and when the computer program is executed by a processor, processes of the foregoing embodiments of the transmission mode determining method or the information configuration method are implemented, with the same technical effects achieved. Details are not described herein again to avoid repetition. Examples of the computer-readable storage medium include a non-transitory computer-readable storage medium such as a read-only memory (ROM), a random access memory (RAM), a magnetic disk, or an optical disc.

An embodiment of this disclosure further provides a computer program product including instructions. When the computer runs the instructions of the computer program product, the computer implements the transmission mode determining method or the information configuration method. Specifically, the computer program product can be run on the foregoing network device.

A person of ordinary skill in the art may be aware that, in combination with the examples described in the embodiments disclosed in this specification, modules and algorithm steps may be implemented by electronic hardware or a combination of computer software and electronic hardware. Whether the functions are performed by hardware or software depends on particular applications and design constraints of the technical solutions. A skilled person in the art may use different methods to implement the described functions for each particular application, but it should not be considered that the implementation goes beyond the scope of this disclosure.

The flowcharts and block diagrams in the accompanying drawings illustrate system structures, functions, and operations of possible implementations of the system, method, and computer program product according to the embodiments of this disclosure. In this case, each block in the flowcharts or the block diagrams may represent a module, a segment, or a part of a code, and the module, the segment or the part of the code includes one or more executable instructions used to realize (one or more) specified logical functions. It should be further noted that each block in the block diagrams and/or the flowcharts and a combination of the blocks in the block diagrams and/or the flowcharts may be implemented by a dedicated hardware-based system for executing a specified function or action or may be implemented by a combination of dedicated hardware and computer instructions.

It can be clearly understood by a skilled person in the art that, for convenient and brief description, for a detailed working process of the systems, apparatuses, and units in the foregoing description, reference may be made to a corresponding process in the foregoing method embodiments, and details are not described herein again.

In the several embodiments provided in this disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When implemented in a form of a software functional unit and sold or used as an independent product, the functions may be stored in a computer-readable storage medium. Based on such an understanding, the technical solutions of this disclosure essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the method described in the embodiments of this disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are only specific embodiments of this disclosure, but are not intended to limit the protection scope of this disclosure. Any variation or replacement readily figured out by persons skilled in the art within the technical scope disclosed in this disclosure shall fall within the protection scope of this disclosure. Therefore, the protection scope of this disclosure shall be subject to the protection scope of the claims.

What is claimed is:

1. A transmission mode determining method, applied to a terminal device, wherein the transmission mode determining method comprises:
   determining, based on first preset information carried by downlink control information (DCI), a transmission scheme for a physical downlink shared channel (PDSCH) scheduled by one DCI; wherein the first preset information comprises a first parameter and a third parameter, wherein the first parameter is the number of slot-based repetitions of the PDSCH in time domain, the third parameter is the number of transmission configuration indicator (TCI) states indicated by the DCI scheduling the PDSCH; wherein
   when a value of the first parameter is greater than 1 and a value of the third parameter is 1, the transmission scheme for the PDSCH is that one DCI schedules one PDSCH with repetition in time domain.

2. The transmission mode determining method according to claim 1, wherein
   the first preset information further comprises at least one of a fourth parameter or a fifth parameter, wherein the fourth parameter is the number of mini-slot based repetitions of the PDSCH in time domain, and the fifth parameter is the number of demodulation reference signal (DMRS) code division multiplexing (CDM) groups of the PDSCH.

3. The transmission mode determining method according to claim 2, wherein before the determining, based on first preset information carried by the downlink control information (DCI), the transmission scheme for the physical downlink shared channel (PDSCH) scheduled by one DCI, the transmission mode determining method further comprises:
   receiving fourth preset information from a network device, wherein the fourth preset information is used for configuring the second parameter, and the fourth preset information is carried in radio resource control (RRC); and
   determining, based on the fourth preset information, the second parameter, wherein the second parameter is a frequency-domain division mode for the PDSCH.

4. The transmission mode determining method according to claim 3, wherein
   a value of the second parameter is one of a first value, a second value, or a third value, wherein
   the first value indicates that the frequency-domain division mode for the PDSCH is a first preset mode, wherein the first preset mode is a division mode that uses no frequency division multiplexing (FDM) transmission scheme;
   the second value indicates that the frequency-domain division mode for the PDSCH is a second preset mode, wherein the second preset mode is one division mode in a preset frequency division multiplexing (FDM) transmission scheme; and
   the third value indicates that the frequency-domain division mode for the PDSCH is a third preset mode, wherein the third preset mode is another division mode in the preset FDM transmission scheme.

5. The transmission mode determining method according to claim 4, wherein
   when a value of the first parameter is 1, the value of the second parameter is the first value, a value of the third parameter is 1, and a value of the fourth parameter is 1, determining that the transmission scheme of the PDSCH is a first preset transmission scheme; or,
   when a value of the first parameter is 1, the value of the second parameter is the first value, a value of the third parameter is greater than 1, a value of the fourth parameter is 1, and a value of the fifth parameter is greater than 1, determining that the transmission scheme of the PDSCH is a second preset transmission scheme; or,
   when a value of the first parameter is 1, the value of the second parameter is the first value, a value of the third parameter is greater than 1, a value of the fourth parameter is greater than 1, and a value of the fifth parameter is greater than 1, determining that the transmission scheme of the PDSCH is a third preset transmission scheme; or,
   when a value of the first parameter is 1, the value of the second parameter is the first value, a value of the third parameter is greater than 1, a value of the fourth parameter is greater than 1, and a value of the fifth parameter is 1, determining that the transmission scheme of the PDSCH is a fourth preset transmission scheme; or,
   when a value of the first parameter is 1, the value of the second parameter is the first value, a value of the third parameter is greater than 1, and a value of the fourth parameter is 1, determining that the transmission scheme of the PDSCH is a fifth preset transmission scheme; or,
   when a value of the first parameter is 1, the value of the second parameter is the first value, a value of the third parameter is greater than 1, and a value of the fourth parameter is greater than 1, determining that the transmission scheme of the PDSCH is a sixth preset transmission scheme; or, when a value of the first parameter is 1, the value of the second parameter is the second value, a value of the third parameter is greater than 1, and a value of the fourth parameter is 1, determining that the transmission scheme of the PDSCH is a seventh preset transmission scheme; or, when a value of the first parameter is 1, the value of the second parameter is the second value, a value of the third parameter is greater than 1, and a value of the fourth parameter is greater than 1, determining that the transmission scheme of the PDSCH is an eighth preset transmission scheme; or, when a value of the first parameter is 1, the value of the second parameter is the third value, a value of the third parameter is greater than 1, and a value of the fourth parameter is 1, determining that the transmission scheme of the PDSCH is a ninth preset transmission scheme; or, when a value of the first parameter is 1, the value of the second parameter is the third value, a value of the third parameter is greater than 1, and a value of the fourth parameter is greater than 1, determining that the transmission scheme of the PDSCH is a tenth preset transmission scheme; or, when a value of the first parameter is greater than 1, the value of the second parameter is the first value, a value of the third parameter is greater than 1, a value of the fourth parameter is 1, and a value of the fifth parameter is 1, determining that the transmission scheme of the PDSCH is a twelfth preset transmission scheme; or, when a value of the first parameter is greater than 1, the value of the second parameter is the first value, a value of the third parameter is greater than 1, a value of the fourth parameter is 1, and a value of the fifth parameter is greater than 1, determining that the transmission scheme of the PDSCH is a thirteenth preset transmission scheme; or, when a value of the first parameter is greater than 1, the value of the second parameter is the second value, a value of the third parameter is greater than 1, and a value of the fourth parameter is 1, determining that the transmission scheme of the PDSCH is a fourteenth preset transmission scheme; or, when a value of the first parameter is greater than 1, the value of the second parameter is the third value, a value of the third parameter is greater than 1, and a value of the fourth parameter is 1, determining that the transmission scheme of the PDSCH is a fifteenth preset transmission scheme.

6. The transmission mode determining method according to claim 5, wherein the transmission scheme of the PDSCH satisfies at least one of the following:
the first preset transmission scheme is that one DCI schedules one PDSCH with no repetition in time domain, or that one DCI in a transmission scheme of scheduling multiple PDSCHs by multiple DCIs schedules one PDSCH;
the second preset transmission scheme is scheme 1a with no repetition in time domain;
the third preset transmission scheme is a scheme combining scheme 1a and scheme 3;
the fourth preset transmission scheme is scheme 3;
the fifth preset transmission scheme is scheme 1a;

the sixth preset transmission scheme is scheme 3;
the seventh preset transmission scheme is scheme 2a;
the eighth preset transmission scheme is a scheme combining scheme 2a and scheme 3;
the ninth preset transmission scheme is scheme 2b;
the tenth preset transmission scheme is a scheme combining scheme 2b and scheme 3;
the twelfth preset transmission scheme is scheme 4;
the thirteenth preset transmission scheme is a scheme combining scheme 1a and scheme 4;
the fourteenth preset transmission scheme is a scheme combining scheme 2a and scheme 4; or,
the fifteenth preset transmission scheme is a scheme combining scheme 2b and scheme 4.

7. The transmission mode determining method according to claim 4, further comprising:
determining, based on the second parameter, transmission configuration information of the PDSCH.

8. The transmission mode determining method according to claim 7, wherein
the transmission configuration information comprises TCI states, and the determining, based on the second parameter, the transmission configuration information of the PDSCH comprises:
when a value of the first parameter is greater than 1, the value of the second parameter is the first value, a value of the third parameter is greater than 1, and a value of the fourth parameter is 1, determining, based on preset TCI state sequence information, a TCI state for each slot-based repetitive transmission of the PDSCH in time domain; or
when a value of the first parameter is 1, the value of the second parameter is the first value, a value of the third parameter is greater than 1, and a value of the fourth parameter is greater than 1, determining, based on preset TCI state sequence information, a TCI state for each mini-slot-based repetitive transmission of the PDSCH in time domain.

9. The transmission mode determining method according to claim 8, wherein before the determining, based on the second parameter, the transmission configuration information of the PDSCH, the transmission mode determining method further comprises:
receiving second preset information from the network device, wherein the second preset information is used for configuring the preset TCI state sequence information; and
determining, based on the second preset information, the preset TCI state sequence information.

10. The transmission mode determining method according to claim 9, wherein
if the preset TCI state sequence information comprises multiple TCI state sequences, before the determining, based on the second parameter, the transmission configuration information of the PDSCH, the transmission mode determining method further comprises:
receiving third preset information from the network device, wherein the third preset information is used to indicate a target TCI state sequence, and the target TCI state sequence is one of the multiple TCI state sequences;
the determining, based on the preset TCI state sequence information, the TCI state for each slot-based repetitive transmission of the PDSCH in the time domain comprises: determining, based on the target TCI state sequence, a TCI state for each slot-based repetitive transmission of the PDSCH in time domain; and the determining, based on the preset TCI state sequence information, the TCI state for each mini-slot-based repetitive transmission of the PDSCH in time domain comprises: determining, based on the target TCI state sequence, a TCI state for each mini-slot-based repetitive transmission of the PDSCH in time domain.

11. The transmission mode determining method according to claim 7, wherein the transmission configuration information comprises TCI states, and the determining, based on the second parameter, the transmission configuration information of the PDSCH comprises:

when a value of the first parameter is greater than 1, the value of the second parameter is the second value, and a value of the third parameter is greater than 1, determining that multiple TCI states indicated by a same DCI are used for each repetitive transmission of the PDSCH in time domain; or when a value of the first parameter is greater than 1, the value of the second parameter is the third value, and a value of the third parameter is greater than 1, determining that multiple TCI states indicated by a same DCI are used for each repetitive transmission of the PDSCH in time domain; or when the value of the second parameter is the second value, a value of the third parameter is greater than 1, and a value of the fourth parameter is greater than 1, determining that multiple TCI states indicated by a same DCI are used for each repetitive transmission of the PDSCH in time domain; or when the value of the second parameter is the third value, a value of the third parameter is greater than 1, and a value of the fourth parameter is greater than 1, determining that multiple TCI states indicated by a same DCI are used for each repetitive transmission of the PDSCH in time domain.

12. The transmission mode determining method according to claim 7, wherein the transmission configuration information comprises TCI states, and the determining, based on the second parameter, the transmission configuration information of the PDSCH comprises:

when a value of the first parameter is 1, the value of the second parameter is the first value, a value of the third parameter is greater than 1, a value of the fourth parameter is 1, and a value of the fifth parameter is greater than 1, determining that the TCI states for transmission of the PDSCH correspond to the DMRS CDM groups in the fifth parameter; or when a value of the first parameter is 1, the value of the second parameter is the first value, a value of the third parameter is greater than 1, a value of the fourth parameter is greater than 1, and a value of the fifth parameter is greater than 1, determining that the TCI states for each repetitive transmission of the PDSCH in time domain correspond to the DMRS CDM groups in the fifth parameter; or when a value of the first parameter is greater than 1, the value of the second parameter is the first value, a value of the third parameter is greater than 1, a value of the fourth parameter is 1, and a value of the fifth parameter is greater than 1, determining that the TCI states for each repetitive transmission of the PDSCH in time domain correspond to the DMRS CDM groups in the fifth parameter.

13. The transmission mode determining method according to claim 12, wherein a correspondence between the TCI states for the PDSCH and the DMRS CDM groups in the fifth parameter is configured by the network device; or a correspondence between the TCI states for the PDSCH and the DMRS CDM groups of the in the fifth parameter is a preset one-to-one correspondence.

14. The transmission mode determining method according to claim 7, wherein the transmission configuration information comprises TCI states, and the determining, based on the second parameter, the transmission configuration information of the PDSCH comprises:

when a value of the first parameter is 1, the value of the second parameter is the second value, a value of the third parameter is greater than 1, and a value of the fourth parameter is 1, determining that the TCI states for each repetitive transmission of the PDSCH in time domain correspond to multiple frequency-domain resources; or when a value of the first parameter is 1, the value of the second parameter is the second value, a value of the third parameter is greater than 1, and a value of the fourth parameter is greater than 1, determining that the TCI states for each repetitive transmission of the PDSCH in time domain correspond to multiple frequency-domain resources; or when a value of the first parameter is 1, the value of the second parameter is the third value, a value of the third parameter is greater than 1, and a value of the fourth parameter is 1, determining that the TCI states for each repetitive transmission of the PDSCH in time domain correspond to multiple frequency-domain resources; or when a value of the first parameter is 1, the value of the second parameter is the third value, a value of the third parameter is greater than 1, and a value of the fourth parameter is greater than 1, determining that the TCI states for each repetitive transmission of the PDSCH in time domain correspond to multiple frequency-domain resources; or when a value of the first parameter is greater than 1, the value of the second parameter is the second value, a value of the third parameter is greater than 1, and a value of the fourth parameter is 1, determining that the TCI states for each repetitive transmission of the PDSCH in time domain correspond to multiple frequency-domain resources; or when a value of the first parameter is greater than 1, the value of the second parameter is the third value, a value of the third parameter is greater than 1, and a value of the fourth parameter is 1, determining that the TCI states for each repetitive transmission of the PDSCH in time domain correspond to multiple frequency-domain resources.

15. The transmission mode determining method according to claim 14, wherein a correspondence between the TCI states for the PDSCH and the multiple frequency-domain resources is configured by the network device; or a correspondence between the TCI states for the PDSCH and the multiple frequency-domain resources is a preset one-to-one correspondence.

16. An information configuration method, applied to a network device, wherein the information configuration method comprises:

sending first preset information to a terminal device in downlink control information (DCI);

wherein the first preset information comprises a first parameter and a third parameter, wherein the first parameter is the number of slot-based repetitions of a physical downlink shared channel (PDSCH) in time domain, the PDSCH is scheduled by one DCI, the third parameter is the number of transmission configuration indicator (TCI) states indicated by the DCI scheduling the PDSCH; wherein when a value of the first parameter is greater than 1 and a value of the third parameter is 1, a transmission scheme for the PDSCH is that one DCI schedules one PDSCH with repetition in time domain.

17. A terminal device comprising: a memory, a processor, and a program stored in the memory and capable of running on the processor, wherein when the program is executed by the processor, the following steps are implemented:

determining, based on first preset information carried by downlink control information (DCI), a transmission scheme for a physical downlink shared channel (PDSCH) scheduled by one DCI; wherein the first preset information comprises a first parameter and a third parameter, wherein the first parameter is the number of slot-based repetitions of the PDSCH in time domain, the third parameter is the number of transmission configuration indicator (TCI) states indicated by the DCI scheduling the PDSCH; wherein when a value of the first parameter is greater than 1 and a value of the third parameter is 1, the transmission scheme for the PDSCH is that one DCI schedules one PDSCH with repetition in time domain.

18. The information configuration method according to claim 16, further comprising:

sending fourth preset information to a terminal device through radio resource control (RRC); wherein the fourth preset information is used for configuring a second parameter, the second parameter is a frequency-domain division mode for the PDSCH, and the second parameter is used for determining the transmission scheme for the PDSCH.

19. The information configuration method according to claim 18, wherein a value of the second parameter is one of a first value, a second value, or a third value, wherein the first value indicates that the frequency-domain division mode for the PDSCH is a first preset mode, wherein the first preset mode is a division mode that does not use a frequency division multiplexing (FDM) transmission scheme;

the second value indicates that the frequency-domain division mode for the PDSCH is a second preset mode, wherein the second preset mode is a division mode in a preset frequency division multiplexing (FDM) transmission scheme; and the third value indicates that the frequency-domain division mode for the PDSCH is a third preset mode, wherein the third preset mode is another division mode in the preset FDM scheme.

20. A network device comprising: a memory, a processor, and a program stored in the memory and capable of running on the processor, wherein when the program is executed by the processor, the following steps are implemented:

sending first preset information to a terminal device in downlink control information (DCI);

wherein the first preset information comprises a first parameter and a third parameter, wherein the first parameter is the number of slot-based repetitions of a physical downlink shared channel (PDSCH) in time domain, the PDSCH is scheduled by one DCI, the third parameter is the number of transmission configuration indicator (TCI) states indicated by the DCI scheduling the PDSCH; wherein when a value of the first parameter is greater than 1 and a value of the third parameter is 1, a transmission scheme for the PDSCH is that one DCI schedules one PDSCH with repetition in time domain.

* * * * *